United States Patent
Hindermann et al.

[15] 3,673,221
[45] June 27, 1972

[54] ACID ANTHRAQUINONE DYESTUFFS

[72] Inventors: Peter Hindermann, Bottmingen/Basel-Land; Hubert Meindl, Riehen/Basel, both of Switzerland

[73] Assignee: Ciba-Geigy AG, Basel, Switzerland

[22] Filed: Sept. 22, 1969

[21] Appl. No.: 860,042

[30] Foreign Application Priority Data

Oct. 3, 1968 Switzerland ..................14804/68

[52] U.S. Cl. ...........................260/374, 8/39, 8/40
[51] Int. Cl. ...........................................C09b 1/30
[58] Field of Search...................................260/374

[56] References Cited

FOREIGN PATENTS OR APPLICATIONS 1,013,442  12/1965  Great Britain..................260/374

*Primary Examiner*—Lorraine A. Weinberger
*Assistant Examiner*—E. J. Skelly
*Attorney*—Wenderoth, Lind & Ponack

[57] ABSTRACT

Acid anthraquinone dyestuffs are disclosed which are the formula

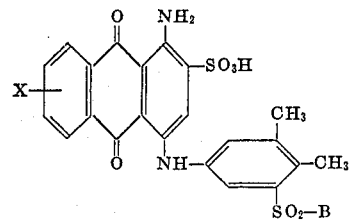

wherein X is hydrogen or $SO_3^\ominus M^\oplus$ and B is —OH or

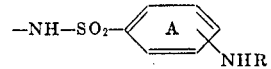

wherein R denotes hydrogen or lower alkyl and wherein any substituent of A other than NHR is selected from hydrogen, halogen, lower alkyl or $SO_3^\ominus M^\oplus$, and $M^\oplus$ is one equivalent of a colorless cation.

These dyestuffs are useful for the dyeing and printing of organic materials especially materials made from natural and synthetic polyamide.

The resulting dyeings are distinguished by purity, good fastness to light, washing and perspiration.

The dyestuffs in which B represents

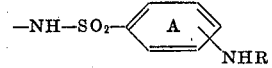

are moreover valuable as intermediate products for the production of fiber reactive dyestuffs for cellulose and polyamide material.

7 Claims, No Drawings

ACID ANTHRAQUINONE DYESTUFFS

DESCRIPTION OF THE INVENTION

The present invention relates to new acid anthraquinone dyestuffs, a process for the production of these dyestuffs, their use for the dyeing and printing of organic materials, especially fiber material made from natural and synthetic polyamide, as well as, as an industrial product, the material dyed and printed using the new dyestuffs.

In the case of the reaction, occurring under the usual conditions, of 1-amino-4-bromo-anthraquinone-2-sulphonic acid with 1-aminobenzene-3-sulphonic acid or 3,3'-diaminodibenzene disulphimide in aqueous medium, e.g., in the presence of catalysts, such as copper or copper salts, and of acid-binding agents at temperatures of 80°–100°C, large amounts of difficultly removable by-products are formed in addition to the desired anthraquinone dyestuff. It is possible to reduce the amount of these undesirable by-products by limiting the quantity of acid-binding agents, working at lower temperatures or by a combination of the two stated measures.

With a reaction temperature of below 80° C., e.g., of 70°–75° C., the condensation proceeds however only very slowly and, after a reaction time of 2 to 5 hours, only traces of the desired anthraquinone dyestuff are formed.

It has now been found that, in a surprising manner, the condensation of 1-amino-4-halogen-anthraquinone-2-sulphonic acid with 1-amino-4,5-dimethyl-benzene-3-sulphonic acid or with 3,3'-diamino-5,6-dimethyl-dibenzene-disulphimides, under the described conditions, proceeds rapidly, with very high yields and only with the formation of few by-products. The surprising reactivity of the starting materials, used according to the invention, i.e., both of the 1-amino-4,5-dimethyl-benzene-3-sulphonic acid and of the new 3,3'-diamino-5,6-dimethyl-dibenzene disulphimides, was to be anticipated neither from the behaviour of the known 1-aminobenzene-3-sulphonic acid or the 3,3'-diaminodibenzene disulphimide, nor from that of isomeric alkyl derivatives with respect to condensation with 1-amino-4-halogen-anthraquinone-2-sulphonic acid.

The new, easily accessible anthraquinone compounds which, amongst other things, can be used as acid anthraquinone dyestuffs for the dyeing of natural and synthetic polyamide fibers, are those of the general Formula III

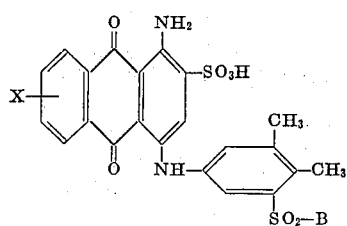

wherein
X represents hydrogen or $SO_3^\ominus M^\oplus$ wherein $M^\oplus$ denotes one equivalent of a colorless cation and
B represents OH or the group

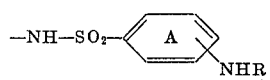

wherein R denotes hydrogen or a lower alkyl group and wherein the phenylene radical A can be further substituted.

Preferably B denotes in the above Formula III the group

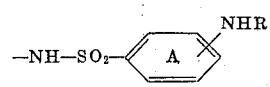

wherein the phenylene radical A can have as further substituents, especially halogen atoms such as fluorine, chlorine or bromine, lower alkyl groups such as the methyl or ethyl group and sulphonic acid groups. R in the meaning of a lower alkyl group represents for example the methyl or ethyl group.

In preferred anthraquinone dyestuffs B represents the group

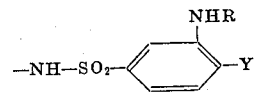

wherein Y is selected from hydrogen, halogen or $SO_3^\ominus M^\oplus$, and R represents hydrogen.

These new acid anthraquinone dyestuffs are obtained by reacting an anthraquinone compound of the general Formula I,

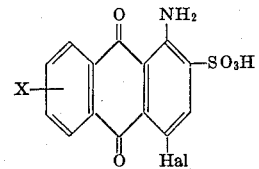

wherein
Hal represents a halogen atom up to atomic number 35 and
X represents hydrogen or $SO_3^\ominus M^\oplus$ with an amine of the general Formula II,

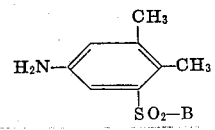

wherein
B has the meaning given in Formula III under the usual conditions, e.g., in the presence of an acid-binding agent and a copper catalyst at temperatures of 50°–100° C., advantageously in aqueous medium and with a pH-value of at least 5, to give an anthraquinone dyestuff of the general Formula III

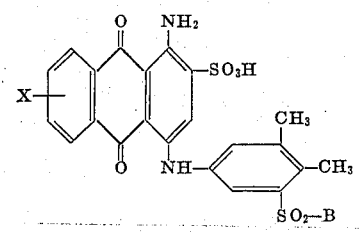

In Formula I "X" represents preferably hydrogen, and "-Hal" advantageously represents bromine but, optionally, also chlorine or fluorine.

Starting materials of the Formula I are known. The following are mentioned as examples of particularly suitable starting materials:
1-amino-4-bromo-anthraquinone-2,6-disulphonic acid,
1-amino-4-chloro-anthraquinone-2,6-disulphonic acid,
1-amino-4-bromo-anthraquinone-2-sulphonic acid,
1-amino-4-chloro-anthraquinone-2sulphonic acid,
1-amino-4-bromo-anthraquinone-2,7-disulphonic acid, or also mixtures of anthraquinone sulphonic acids such as:
1-amino-4-bromo-anthraquinone-2,5- and -2,8- or -2,6- and -2,7-disulphonic acid.

The amines of the Formula II, usable as starting materials, are new. Amines of the Formula II, wherein B represents the $NH_2$ group

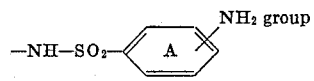

are obtained, e.g., analogously to the working procedure of M.L. Crossley, E.H. Northey, M.E. Haltquist, J.Am.Chem.Soc. 60, 2,222–2,224 (1938), by reacting 1-nitrobenzene-4,5-dimethyl-3-sulphonic acid chloride with a nitrobenzene sulphonic acid amide to give the corresponding 3,2'-, 3,3'- or 3,4'-dinitro-5,6-dimethyl-dibenzene disulphimide, and thereupon reducing the two nitro groups.

Amines of Formula II, wherein B represents the —OH— group, are obtained, e.g., by nitrating 1,2-dimethylbenzene, isolating from the mixture of isomers the 1-nitro-4,5-dimethylbenzene in the usual manner, converting the latter with chlorosulphonic acid into the corresponding 1-nitro-4,5-dimethylbenzene-3-sulphonic acid chloride, saponifying this with dilute sodium hydroxide solution to the corresponding 3-sulphonic acid and thereupon reducing in the latter the nitro group to the amino group, e.g., according to Béchamps.

Particularly suitable for the process according to the invention are amines of the Formula II, wherein B represents the group

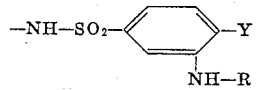

and especially the group

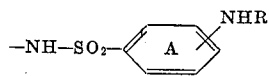

wherein Y denotes hydrogen, $SO_3 \ominus M \oplus$ or halogen and wherein R denotes hydrogen.

The following are given as examples with respect to amines of the Formula II:

3-amino-5,6-dimethylbenzene-1-sulphonic acid,
3,3'-diamino-5,6-dimethyl-dibenzenedisulphimide,
3,3'-diamino-5,6-dimethyl-dibenzenedisulphimide-6'-sulphonic acid,
3,3'-diamino-5,6-dimethyl-6'-chloro-dibenzenedisulphimide,
3,4'-diamino-5,6-dimethyl-dibenzenedisulphimide,
3,2'-diamino-5,6-dimethyl-dibenzenedisulphimide,
3,2'-diamino-5,6-dimethyl-4',5'-dichloro-dibenzenedisulphimide,
3,2'-diamino-5,5',6-trimethyl-dibenzenedisulphimide,
3-amino-4'-methylamino-5,6-dimethyl-dibenzenedisulphimide,
3,3'-diamino-5,6-dimethyl-dibenzenedisulphimide-4'-sulphonic acid,
3,3'-diamino-4',5,6,6'-tetramethyl-dibenzenedisulphimide,
3,3'-diamino-4',5,5',6-tetramethyl-dibenzenedisulphimide,
3,2'-diamino-4',5,6,6'-tetramethyl-dibenzenedisulphimide,
3,2'-diamino-5,6-dimethyl-4'-bromo-dibenzenedisulphimide,
3,2'-diamino-5,6-dimethyl-5'-chloro-dibenzenedisulphimide,
3,3'-diamino-5,6-dimethyl-4'-bromo-dibenzenedisulphimide,
3-amino-4'-ethylamino-5,6-dimethyl-dibenzenedisulphimide,
3,2'-diamino-5,6-dimethyl-5'-bromo-dibenzenedisulphimide,
3,3'-diamino-5,6,4'-trimethyl-dibenzenedisulphimide,
3,3'-diamino-5,6-dimethyl-6'-bromo-dibenzenedisulphimide,
3,3'-diamino-2',4',5,6,6'-pentamethyl-dibenzenedisulphimide,
3,3'-diamino-2',4',5,6-tetramethyl-dibenzenedisulphimide,
3,3'-diamino-5,6-dimethyl-5'-chloro-dibenzenedisulphimide,
3,3'-diamino-5,6-dimethyl-4'-chloro-dibenzenedisulphimide,
3,3'-diamino-5,6,6'-trimethyl-dibenzenedisulphimide and
3,3'-diamino-5,6-dimethyl-2',4'-diethyl-dibenzenedisulphimide.

The starting compounds of the Formulas I and II are advantageously used in the molar ratio of approximately 1:1.05 to 1:1.5; an excess of the easily removable component of the Formula II is advisable.

The condensation of an anthraquinone compound of the formula I with an amine of the Formula II is advantageously carried out at temperatures between 70° and 100° C., preferably at 70°–85° C., and especially at 70°–75° C., in aqueous or aqueous-organic solution and in the presence of a copper catalyst and an acid-binding agent with a pH-value of at least 5, preferably 7 – 10. It proceeds smoothly with very high yield and only a few formation of by-products and is practically finished after 2 to 6 hours reaction time.

Particularly suitable copper catalysts are, e.g. copper metal and copper-(I)- and -(II)-salts such as copper-(I)-chloride, -bromide, -iodide, -acetate, -sulphate or -oxide. Preferably, metallic copper powder is used, a copper-(I)-salt or copper-(I)-oxide. Mixtures too have proved to be very advantageous, e.g., mixtures of copper-(I)-chloride with metallic copper. The catalysts are added in catalytic amounts.

It is possible to use as acid-binding agents, e.g., especially alkali-metal bicarbonates or -carbonates such as lithium, sodium and potassium bicarbonate or -carbonate, or alkali phosphates. Sodium bicarbonate is preferably used.

The acid anthraquinone dyestuffs of the Formula III are isolated, in the usual manner, preferably as alkali metal salts, particularly as sodium salts, or as ammonium salts.

The new acid anthraquinone dyestuffs of the Formula III are suitable for the dyeing and printing of organic materials, especially of fiber material made from natural and synthetic polyamide, particularly wool, but also nylon or polyurethane fibers. Certain of the new dyestuffs are evenly absorbed by the material from a slightly acid bath and others from a more strongly acid bath at higher temperatures and they possess good levelling and migration properties. The thereby obtained dyeings are distinguished by the purity of the blue shades, by a good fastness to light, as well as by good fastness to washing and perspiration. When dyeing mixed fabrics made from polyamide and polyacryloamide fibers, e.g., "Orlon" only the polyamide part thereof is dyed while the polyacryloamide fibers are reserved.

Those anthraquinone dyestuffs of the Formula III, wherein B represents the

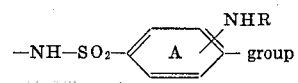

in which especially R denotes hydrogen, constitute moreover valuable intermediate products for the production of reactive dyestuffs for cellulose and polyamide material.

The following non-limitative examples illustrate the invention further. The temperatures are given therein in degrees Centigrade.

EXAMPLE 1

50.6 g of 1-amino-4-bromo-anthraquinone-2,6-disulphonic acid sodium, 46.3 g of 3,3'-diamino-5,6-dimethyl-dibenzenedisulphimide and 30 g of sodium bicarbonate are added to 450 ml of water. The mixture is heated to a temperature of 70°–75° and, while stirring well, 2.5 g of copper-(I)-bromide are added in portions at this temperature within 30 minutes. Stirring proceeds for a further 5 hours at 70°–75° to complete the dyestuff formation, whereupon the formed dyestuff is precipitated from the reaction solution with sodium chloride. The dyestuff is filtered off, washed with a 25% aqueous sodium chloride solution and dried. The dyestuff corresponds to the formula

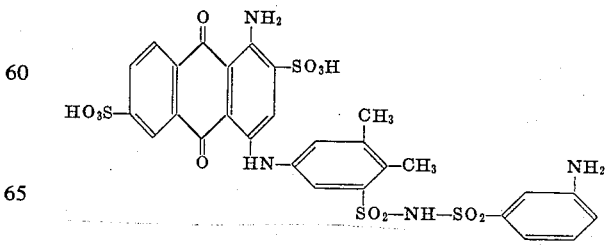

and is in the form of a dark-blue powder, which dissolves in concentrated sulphuric acid to give a cloudy, greenish-blue color and in water to give a pure greenish-blue color. The dyestuff dyes wool and synthetic polyamide fibers, from an acetic acid to sulphuric acid bath, in even greenish-blue shades having a good fastness to light.

The applied 3,3'-diamino-5,6-dimethyl-dibenzenedisulphimide was produced as follows.

1-nitro-4,5-dimethylbenzene is dissolved in chlorosulphonic acid and the solution is stirred during 8 hours at 100°–110°. The solution is then cooled to room temperature and, while vigorously stirring, it is poured on to a mixture of ice and water, the precipitated 1-nitro-4,5-dimethylbenzene-3-sulphonic acid chloride is filtered off and washed with water until neutral. The crude sulphonic acid chloride can be purified by crystallization from petroleum ether and has a M.P. of 100° – 101°. The recrystallized sulphonic acid chloride is then reacted in aqueous suspension with m-nitrobenzenesulphonic acid amide at 30°–40° and with a pH-value of 9.5 – 11.0 (kept constant with aqueous sodium hydroxide solution) to give the corresponding 3,3'-dinitro-5,6-dimethyl-dibenzenedisulphimide, which precipitates from the reaction mixture in high yield and with a high degree of purity. This dinitro compound is finally reduced, according to Béchamps, to the corresponding 3,3'-diamino compound.

If, for comparison, Example 1 is repeated using however, instead of 3,3'-diamino-5,6-dimethyl-dibenzenedisulphimide, 43.5 g of 3,3'-diamino-dibenzenedisulphimide, then only small amounts of a blue anthraquinone dyestuff mixture are obtained, whereas with the amine used in Example 1, a homogeneous dyestuff is obtained in over 80 percent yield.

If the 50.6 g of 1-amino-4-bromo-anthraquinone-2,6-disulphonic acid sodium, used in Example 1, are replaced by an equivalent amount of the corresponding 4-chloro-derivative, with the procedure being otherwise as stated in the example, a blue dyestuff is thus obtained having similar properties.

EXAMPLE 2

40.4 g of 1-amino-4-bromo-anthraquinone-2-sulphonic acid sodium are slurried in 500 ml of water. To this suspension are added 58.3 g of 3,3'-diamino-5,6-dimethyl-dibenzenedisulphimide-6'-sulphonic acid sodium and 10 g of sodium bicarbonate. The reaction mixture is heated to 75°–80° and, with a good stirring action, a homogeneous mixture, consisting of 0.25 g of copper powder, 0.25 g of copper-(I)-chloride and 20 g of sodium bicarbonate, is sprinkled in at the said temperature within 45 minutes. To ensure completion of the dyestuff formation, stirring proceeds for a further 4 hours at 75°–80°, whereupon the dyestuff is precipitated at room temperature from the reaction mixture by the addition of potassium chloride. The dyestuff, which corresponds to the formula

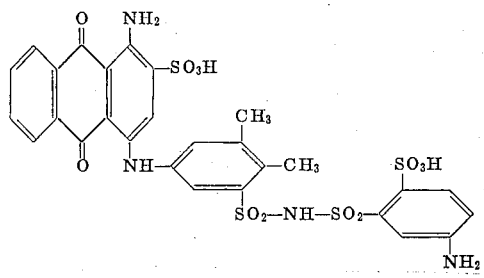

is filtered off and the filtrate subsequently washed with 25 percent potassium chloride solution. The dyestuff is then dissolved in 500 ml of water to give a neutral solution, filtered from undissolved residue, precipitated with potassium chloride, filtered, washed and dried. The thus obtained dyestuff is in the form of a dark-blue powder, which dissolves in concentrated sulphuric acid to give a greenish-blue color and in water to give a pure blue color. The dyestuff dyes wool and synthetic polyamide fibers from an acetic acid to sulphuric acid bath, in even, pure-blue shades.

EXAMPLE 3

50.6 g of 1-amino-4-bromo-anthraquinone-2,7-disulphonic acid sodium, 43.8 g of 3,3'-diamino-5,6-dimethyl-6'-chloro-dibenzenedisulphimide and 118 g of sodium-o-phosphate sec. (Na$_2$HPO$_4 \cdot$12H$_2$O) are introduced into 550 ml of water and the reaction mixture is heated to 90°–95°. To this are added in portions, while stirring well and within 50 minutes, 2.5 g of copper-(I)-chloride. The reaction is completed during 4 hours at 90°–95°. The formed dyestuff of the formula

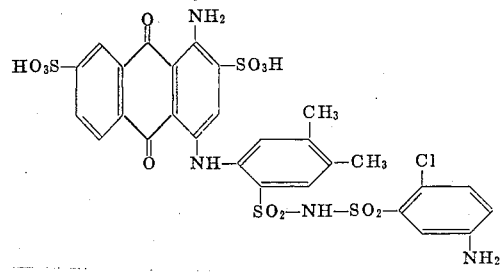

is precipitated from the solution by addition of sodium chloride as sodium salt, filtered off and dried. The dyestuff is in the form of a dark-blue powder which dissolves in concentrated sulphuric acid to give a greenish-blue color and in water to give a green-blue color. The dyestuff dyes wool and synthetic polyamide fabric, from acetic acid to sulphuric acid bath, in even blue shades.

EXAMPLE 4

46.1 g of 3,3'-diamino-5,6-dimethyl-dibenzene-disulphimide, as neutral sodium salt, are dissolved in 450 ml of water at 50° and to the solution are added 38.2 g of 1-amino-4-bromo-anthraquinone-2-sulphonic acid and 4 g of sodium bicarbonate. The mixture is heated to 80°–85° and into the obtained solution is introduced in portions, within one hour, a mixture of 0.5 g of copper powder and 20 g of sodium bicarbonate. The reaction is completed during 4 hours at 80°–85°, the dyestuff solution is filtered and to the filtrate are added 32 g of sodium chloride. The precipitated dyestuff, corresponding to the formula

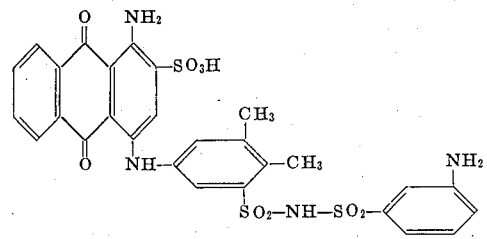

is filtered off, washed with 5 percent sodium chloride solution and dried. The dyestuff is in the form of a dark-blue powder which dissolves in water with a blue color. The dyestuff dyes wool and synthetic polyamide fibers, from an acetic acid bath, in blue shades.

The dyestuff can be used also as starting material for the production of valuable reactive dyestuffs.

EXAMPLE 5

53.2 g of 3,4'-diamino-5,6-dimethyl-dibenzene-disulphimide are dissolved with aqueous sodium hydroxide solution in 600 ml of water to obtain a neutral condition (pH 7 – 7.5) and to the solution are added 38.2 g of 1-amino-4-bromo-anthraquinone-2-sulphonic acid and 4 g of sodium bicarbonate. The mixture is heated to 70° – 74° and a mixture is sprinkled in within 60 minutes, consisting of 1.5 g of copper-(II)-sulphate, 1.5 g of copper powder and 25 g of sodium bicarbonate. The reaction is completed in 5 hours at 70°–75° and the hot dyestuff solution is filtered. The dyestuff of the formula

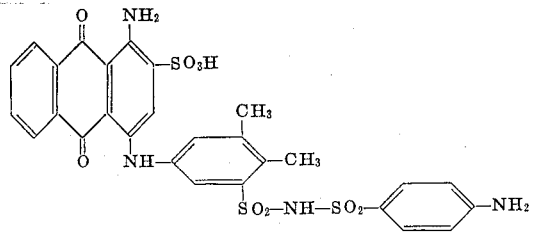

is precipitated by adding to the filtrate, 120 g of potassium chloride and 450 ml of ethanol. The dyestuff is filtered off, washed with ethanol and dried.

The dyestuff is in the form of a dark-blue powder which dissolves in water with a blue color. It dyes wool and synthetic polyamide fibers, from an acetic acid bath, in blue shades. The dyestuff can also be used as starting material for the production of valuable reactive dyestuffs.

If instead of the 38.2 g of 1-amino-4-bromo-anthraquinone-2-sulphonic acid or the 53.2 g of 3,4'-diamino-5,6-dimethyl-dibenzenedisulphimide, equivalent amounts are used of the anthraquinone compounds listed in the following Table I, column II, or of the disulphimide compounds given in column III, with the procedure being otherwise analogous to that described in Example 5, then blue anthraquinone dyestuffs are obtained having similar valuable properties. They can moreover be used as starting materials for the production of valuable reactive dyestuffs.

TABLE I

| I | II | III |
|---|---|---|
| |  |  |

| Example No. | X | Hal | A | R |
|---|---|---|---|---|
| 6 | 6-SO₃H | Br |  | CH₃ |
| 7 | 6-SO₃H | Br |  | H |
| 8 | H | Cl |  | H |
| 9 | 7-SO₃H | Br |  | H |
| 10 | 7-SO₃H | Br |  | H |
| 11 | H | Cl |  | H |
| 12 | H | Br |  | H |
| 13 | 7-SO₃H | Br |  | CH₃ |
| 14 | H | Br |  | H |
| 15 | H | Br |  | H |
| 16 | 6-SO₃H | Br |  | H |
| 17 | H | Br |  | H |
| 18 | H | Br |  | CH₃ |
| 19 | H | Br |  | H |
| 20 | 6-SO₃H | Br |  | H |

Table I—Continued

| | I | II | III | |
|---|---|---|---|---|

Structure I: 1-amino-4-Hal-anthraquinone-2-sulfonic acid with X substituent (positions 5,8 shown)
Structure II: H₂N-(2,3-dimethylphenyl)-SO₂-NHSO₂-
Structure III: -NH-A(1',2',3')-NHR

| Example No | X | Hal | A | R |
|---|---|---|---|---|
| 21 | H | Br | 2,4,6-trimethylphenyl (CH₃ at 2,4,6) | H |
| 22 | H | Br | 2,5-dimethylphenyl | H |
| 23 | 6-SO₃H | Br | 2,5-dimethylphenyl | H |
| 24 | H | Br | 4-Cl-phenyl | H |
| 25 | 6-SO₃H | Br | phenyl | H |
| 26 | 6-SO₃H | Br | 4-SO₃H-phenyl | H |
| 27 | 7-SO₃H | Br | 4-SO₃H-phenyl | H |
| 28 | 7-SO₃H | Br | 4-Cl-phenyl | H |
| 29 | 6-SO₃H | Br | 4-Cl-phenyl | H |
| 30 | 6-SO₃H | Br | 2-Cl-phenyl | H |
| 31 | H | Br | 3-CH₃-phenyl | H |
| 32 | 7-SO₃H | Br | 3,4-diethylphenyl (C₂H₅) | H |

EXAMPLE 33

53.82 g of a mixture of 1-amino-4-bromo-anthraquinone-2,5- and -2,8-disulphonic acid potassium, 39.6 g of 3,3'-diamino-5,6-dimethyl-dibenzenedisulphimide and 34 g of potassium bicarbonate are slurried in 400 ml of water. The reaction mixture is heated to 75° – 80° and to it is added within 20 minutes a mixture of 1.0 g of copper-(I)-chloride and 1.0 g of copper powder. After stirring for a further 3 hours at 75° – 80°, the dyestuff formation is completed. The dyestuff mixture of the formula

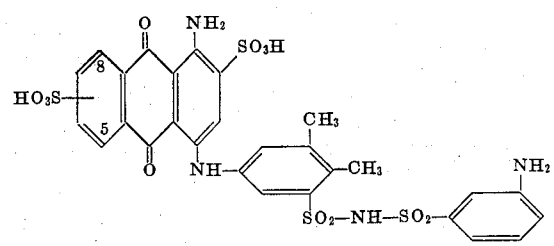

is precipitated by addition of potassium chloride at room temperature, filtered off and dried. The isolated dyestuff mixture is in the form of a dark-blue powder, which dissolves in concentrated sulphuric acid to give a violet color and in water to give a blue color. The dyestuff mixture dyes wool, from an aqueous sulphuric acid bath, in even blue shades having good fastness to light and a good evening shade.

If instead of the 53.82 g of the dyestuff mixture of 1-amino-4-bromo-anthraquinone-2,5- and -2,8-disulphonic acid potassium given in the above example, equivalent amounts are used of the anthraquinone dyestuff mixtures given in the following Table II, column II, and instead of the 39.6 g of 3,3'-diamino-5,6-dimethyl-dibenzene-disulphimide, equivalent amounts of dibenzenedisulphimide as listed in column III, are used with the procedure being otherwise as described in this example, then similarly valuable blue dyestuff mixtures are obtained.

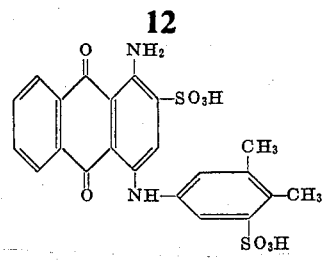

is precipitated as sodium salt at 60° by the addition of sodium chloride. It is filtered, washed with 15 percent aqueous sodium chloride solution and dried. The dyestuff is in the form of a dark-blue powder which dissolves in concentrated sulphuric acid to give a greenish-blue color and in water to give a clear blue color. The yield is practically quantitative. The dyestuff

TABLE II

| Example No. | I X | II Hal | III A | R |
|---|---|---|---|---|
| 34 | 5/8-SO₃H | Br | phenyl | H |
| 35 | 5/8-SO₃H | Br | dichlorophenyl (Cl, Cl) | H |
| 36 | 5/8-SO₃H | Br | CH₂-phenyl | H |
| 37 | 5/8-SO₃H | Br | chlorophenyl (Cl) | H |
| 38 | 6/7-SO₃H | Br | bromophenyl (Br) | H |
| 39 | 5/8-SO₃H | Br | phenyl | C₂H₅ |
| 40 | 5/8-SO₃H | Br | trimethylphenyl (CH₃, CH₃, CH₃) | H |
| 41 | 5/8-SO₃H | Br | chlorophenyl (Cl) | H |

Column I structure: anthraquinone with O, NH₂, SO₃H, X (positions 5,8), and Hal substituents.
Column III structure: H₂N—(CH₃, CH₃ substituted phenyl)—SO₂—NHSO₂—A—NHR

EXAMPLE 42

40.4 g of 1-amino-4-bromo-anthraquinone-2-sulphonic acid sodium are slurried in 300 ml of water at 80° – 85° and to this are added 30.1 g of 1-amino-4,5-dimethylbenzene-3-sulphonic acid. 30 g of sodium bicarbonate are added to the suspension at this temperature and, while stirring well and within 15 minutes, 0.5 g of copper-(I)-chloride is added. After stirring for 5 hours at 85°–90°, the formed dyestuff of the formula dyes wool and synthetic polyamide fibers, as well as mixed fabrics made from the two stated fibers, from an acetic acid to sulphuric acid aqueous bath in pure blue shades having a very good fastness to light and a good evening shade.

If, instead of 30.1 g of 1-amino-4,5-dimethylbenzene-3-sulphonic acid, 22.5 g of 1-aminobenzene-3-sulphonic acid are used, with the procedure otherwise as stated in the example, then only small amounts of a blue anthraquinone dyestuff are formed which, moreover, are difficult to isolate in the pure form from the reaction mixture.

EXAMPLE 43

10 g of wool flannel are introduced at 40° into a bath containing 0.5 g of sodium sulphate, 0.4 ml of 40 percent acetic acid and 0.2 g of dyestuff, according to example 4, in 500 ml of water. The temperature is raised uniformly within 30 minutes to boiling and the wool flannel is dyed for a further hour at the boiling temperature. The dyed material is then rinsed and finished in the usual manner. A very even, pure blue dyeing is obtained having fastness to light and a very good evening shade.

By using 0.1 ml of 85 percent formic acid or 0.1 ml of 96 percent sulphuric acid instead of the 0.4 ml of 40 percent acetic acid and dyeing the material as given in this example, a blue dyeing is obtained possessing the same properties.

If the 10 g of wool flannel are replaced by 10 g of Nylon-6 fabric, with the procedure as described above, a very even, pure blue dyeing is obtained having fastness to light and possessing a very good evening shade.

We claim:

1. A dyestuff of the formula

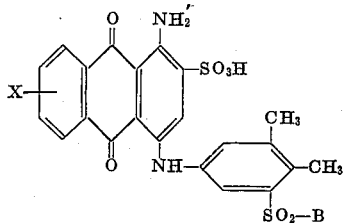

wherein
X is hydrogen or $SO_3H$,
B represents the group

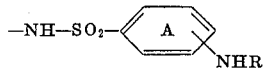

wherein R denotes hydrogen or lower alkyl and any substituent of the nucleus A other than —NHR is selected from hydrogen, $SO_3H$, halogen and lower alkyl.

2. A dyestuff as defined in claim 1 wherein X denotes hydrogen, and B is the group

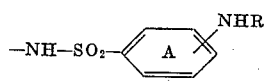

3. A dyestuff as defined in claim 2 wherein B is the group

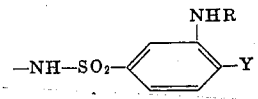

wherein Y is selected from hydrogen, halogen, or $SO_3H$.

4. A dyestuff as defined in claim 3 wherein R is hydrogen.

5. A dyestuff as defined in claim 1 which is of the formula

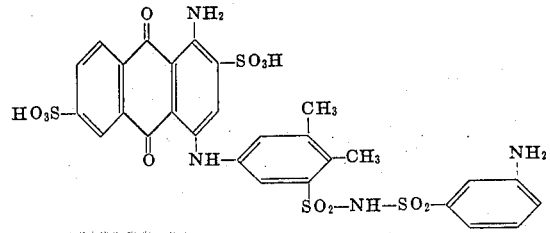

6. A dyestuff as defined in claim 1 which is of the formula

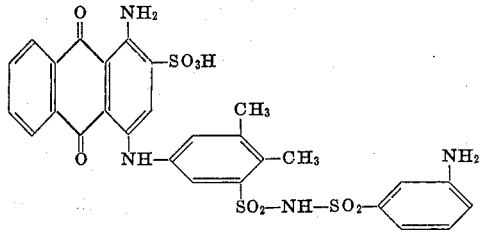

7. A dyestuff as defined in claim 1 which is of the formula

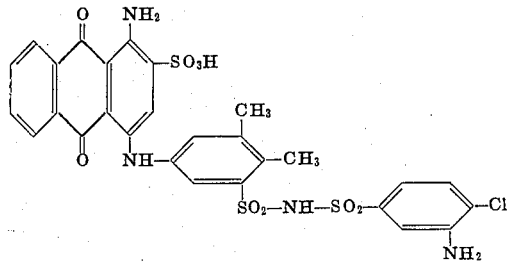

* * * * *